Figure 1:
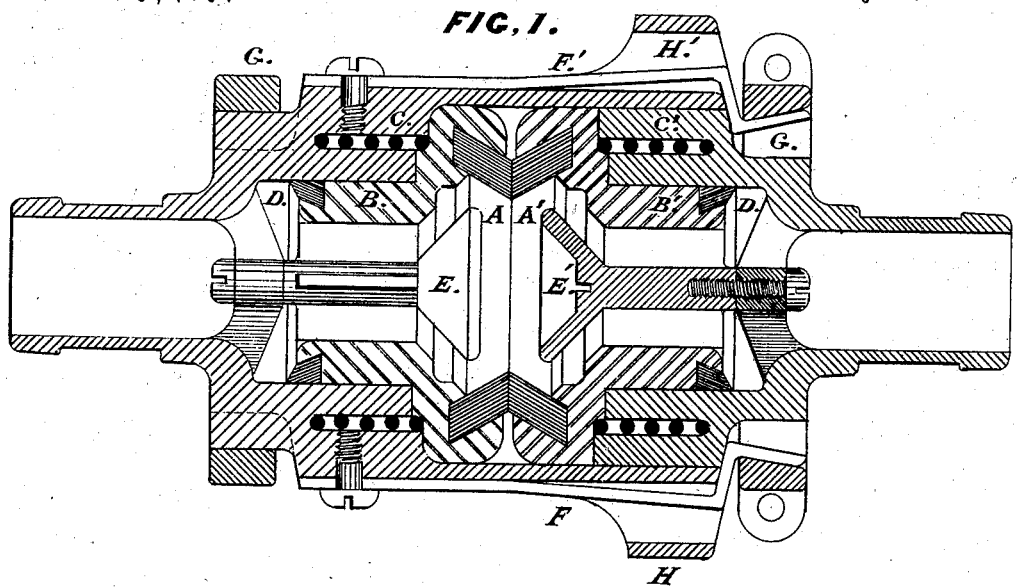

W. M. HENDERSON.
Hose-Coupling.

No. 165,415. Patented July 13, 1875.

WITNESSES.
Charles N. Dupuy
Marmaduke Moore

INVENTOR
William M. Henderson

UNITED STATES PATENT OFFICE.

WILLIAM M. HENDERSON, OF PHILADELPHIA, PENNSYLVANIA.

IMPROVEMENT IN HOSE-COUPLINGS.

Specification forming part of Letters Patent No. 165,415, dated July 13, 1875; application filed June 5, 1875.

*To all whom it may concern:*

Be it known that I, WILLIAM M. HENDERSON, of Philadelphia, Pennsylvania, have invented certain Improvements in Hose-Couplings, of which the following is a specification:

This invention is intended as an improvement upon the patent granted to myself by the United States Patent Office, dated February 17, 1874, No. 147,498, and has for its object, first, to seal the facial joint while the passage through the coupling is being opened and closed, so as not to waste by leakage; and, second, to bind the coupling firmly together, and prevent it blowing apart under confined pressure, the coupling being more particularly designed for hydraulic-pressure brakes for railroad-cars.

In regard to the first object of this improvement, I have ascertained, by direct experiment, that valves provided in the adjacent ends of a coupling, arranged to open each other in the act of coupling, and to close as the coupling is separated, as commonly used in air-brakes upon railroad-cars, are not adapted to hydraulic brakes, on account of the loss by leakage experienced in coupling and uncoupling the hose. When glycerine is used to operate the brakes in low temperatures, the use of such a coupling arrangement is inexpedient, as it sometimes happens that a coupling will stick in uncoupling when partly disunited, the joint being opened, and the valves not yet closed. The result is a loss of fluid, which will continue until the coupling is either fully separated or reunited. Without this a certain amount will always escape during the time the valves are closing, no matter how promptly the uncoupling may be done; for it will be observed that, with such an arrangement of valves, the joint is being opened coincidently with the closing of the said valves. In the reverse operation of coupling a similar loss is experienced by the valves unseating each other before the joint is made; and, again, the full contents of the chambers below the valves will invariably be wasted every time the couplings are separated.

To remedy these defects I cause the vent or passage through the coupling to be formed at or near the mouth of each half of the coupling by the direct agency of contact of the facial joint, in such manner that not until this joint is sealed can any opening through the coupling be made, and in the reverse operation of uncoupling not until the aperture through the coupling is closed can the facial joint be opened, so that in neither case can loss from leakage occur. And in regard to the second object of this improvement, I have found, by actual practice, that with hydraulic pressure, as applied to railroad-car brakes, the simple form of spring-catches invariably used for uniting the hose-couplings will not withstand the internal force tending to blow the couplings apart; to overcome which objection I prolong the free ends of the springs, and slip a clamp-ring over them, attached by a forked chain to the upper hose-clamp. The chain is made about one-half inch shorter than the length of the hose, so that in the event of a car breaking loose the chains, in stretching, will pull the clamp-rings off the ends of the springs, and the coupling will be pulled apart by the separation of the cars, but not otherwise, except by hand, when desired.

To enable others skilled in the art to make and use my invention, I will proceed to describe its construction and manner of use, referring to the annexed drawing.

Figure 2:
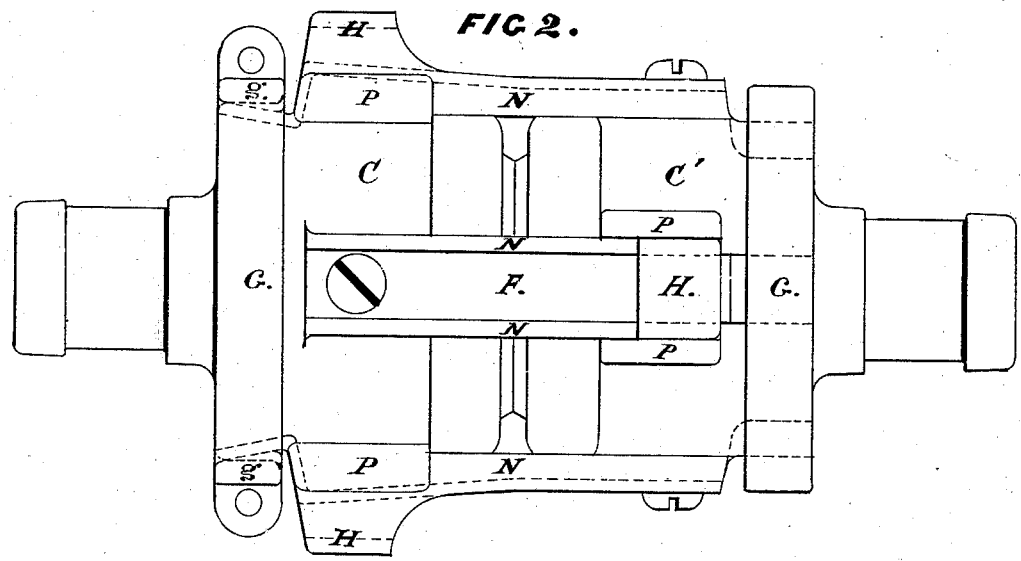
Figure 3:
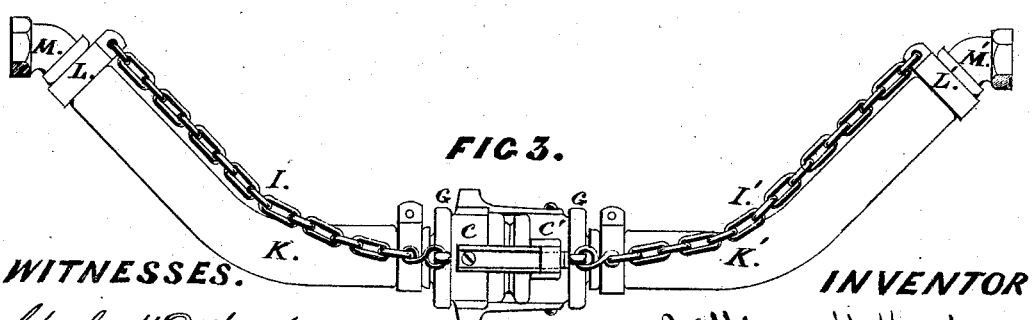

Figure 1 represents a longitudinal section of the improved hose-coupling. Fig. 2 is a longitudinal elevation of the same; and Fig. 3 is a drawing of the coupling in position on flexible hose, with the clamp-rings and safety-chains attached.

A A' are cone-shaped elastic rings of vulcanized india-rubber for making the facial joint, as already described and claimed in the patent issued to me February 17, 1874, No. 147,498. These rings are fitted into corresponding grooves turned in the faces of the movable seats B B', which are turned to fit the cylindrical shell C C', carrying hydraulic packing-rings D D' at their extreme ends to prevent leakage. This is provided for, either under pressure or without, by making the outside beveled edge slightly flaring, so as to be compressed in fitting the bore of the shell. A circular groove is turned in each half of the shell, into which is inserted a spiral spring, bearing against the flange of the movable seat, in such manner as to always close the aperture when the coupling is apart. E E' are stationary plugs or stoppers, adjusted to the bore of the movable seats, and are secured to the shell or hose-nozzles, preferably in such manner as to permit the seats and the stoppers to be taken out from the front of the coupling without disturbing the hose, as shown, the amount of opening being arranged by the flange of the movable seats coming in contact with the face of the shells, as shown on Fig. 1. The metallic faces of the said flange are also so arranged as to come in contact and relieve the elastic faces of the coupling from unnecessary compression. F F' are clutch-springs for binding the two halves of the coupling-shells together. They are secured at one end to one of the shells, and clip over a shoulder upon the other, which it engages. These springs are protected by being embedded in horn-plates N, which are received in guides P, arranged upon the opposite half of the coupling-guards H, and are carried over the tops of the springs to prevent them from being sprung back too far, and probably broken by careless handling. The free ends of the springs are prolonged at about five-eighths of an inch beyond the horn-plates, on a slightly-flaring angle, over which are slipped clamp-rings G G', to secure them from yielding to any fluid-pressure. The interior circle of the rings being beveled to suit the angle ends of the springs, sufficient of the bevel is cut away, as shown at $g\ g$, Fig. 2, to enable the rings to be pushed squarely on the spring ends, after which a quarter twist is given them, bringing the bevel part into play, which gives them a hold not to be dislodged by any jarring of the cars in motion.

It will be observed that the springs have an allowance for downward motion in the horn-plates, so that the clamp-rings may be pulled squarely off without injury in the event of an accidental separation of the cars while running. The position of the coupling attached to flexible hose, with the clamp-rings and safety-chains, is shown by Fig. 3, where C C' is the coupling, G G' the clamp-rings, I I' the safety-chains, K K the flexible hose, L L' hose-clamps, and M M' elbows for connecting to the wrought-iron conveying-tubes running under the cars. The safety-chains I I' are forked at their lower ends, so as to lay hold of eyes provided on opposite sides of the clamp-rings, the upper end of the chain being made fast to the hose clamps L L', as shown.

I am aware that valves placed in the ends of hose-couplings, arranged to open each other in the act of coupling, and to close as the coupling is separated, have been proposed, and are described in the English specification of Thomas Wilson, No. 3,816, of 1868, and also in the English patent to James Harris, No. 216, of 1857; but such an arrangement of opening and closing valves coincident with the joining and separation of a hose-coupling I do not desire to employ, and distinctly disclaim.

I am also aware that clutch-springs for holding the two halves of a hose-coupling together by clipping over a shoulder with a beveled edge, capable of self-attaching under strain, have been proposed, and are illustrated and shown in the English patent to Michael Siegrist, No. 3,291, of 1865, and also in the English patent to M. A. F. Mennons, No. 2,889, of 1867; but such an arrangement of detachable coupling I have no desire to use or claim; but What I do claim as my invention, and desire to secure by Letters Patent, is—

1. The fixed plugs or stoppers E E', in combination with the shells C C' and movable seats B B', whereby the vent or passage through the coupling is made at or near the mouth of each half of the coupling by the direct agency of contact of the facial joint, all as herein set forth, for the purpose specified.

2. In a hose-coupling, as described, the internally-beveled slotted clamp-rings G G' and flared clutch-springs F F', combined and acting with and upon each other, as and for the purposes specified.

3. The internally-beveled slotted clamp-rings G G' and flared clutch-springs F F', combined with the coupling C, flexible hose K K', forked check-chains I I', and hose-clamps L L', all connected and acting with and upon each other, as and for the purposes herein set forth.

4. In a hose-coupling, as described, the combination of the springs F with the horn-plates N, with or without the guards H, substantially in the manner and for the purpose specified.

WILLIAM M. HENDERSON.

Witnesses:
CHARLES M. DUPUY,
MARMADUKE MOORE.